United States Patent [19]

Miyawaki

[11] Patent Number: 4,826,473

[45] Date of Patent: May 2, 1989

[54] BELT FOR A CONTINUOUSLY VARIABLE TRANSMISSION

[75] Inventor: Motohisa Miyawaki, Chofu, Japan

[73] Assignee: Fuji Jukogyo Kabushiki Kaisha, Tokyo, Japan

[21] Appl. No.: 114,454

[22] Filed: Oct. 28, 1987

[30] Foreign Application Priority Data

Oct. 30, 1986 [JP] Japan .................. 61-260206

[51] Int. Cl.$^4$ .............................................. F16G 1/22
[52] U.S. Cl. ..................................... 474/240; 474/242
[58] Field of Search ............... 474/240, 242, 244, 245, 474/201

[56] References Cited

U.S. PATENT DOCUMENTS 4,299,586 11/1981 Aberson ........................ 474/242 X
4,369,675 6/1986 Van Deursen ...................... 74/864

FOREIGN PATENT DOCUMENTS 60-159452 8/1985 Japan .

*Primary Examiner*—Thuy M. Bui
*Attorney, Agent, or Firm*—Martin A. Farber

[57] ABSTRACT

A belt is formed by a plurality of metal elements which are assembled by a pair of endless carriers engaging with the elements at both lateral sides thereof. Each element has a plurality of protrusions at the front side thereof so as to engage with the rear side of an adjacent element. The protrusions are provided for appropriately deviating the belt at a tight side.

9 Claims, 4 Drawing Sheets

FIG. 2b (PRIOR ART)
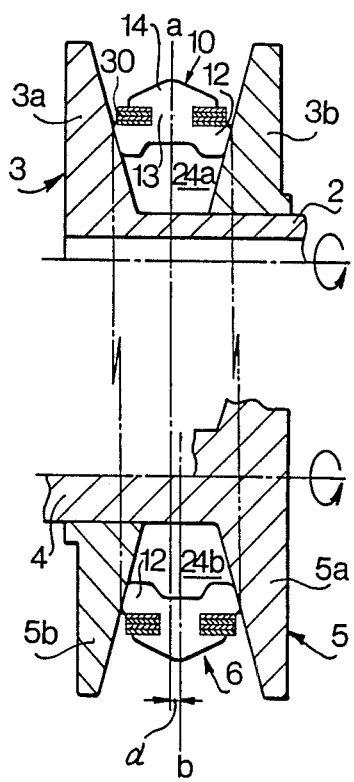
FIG. 2c
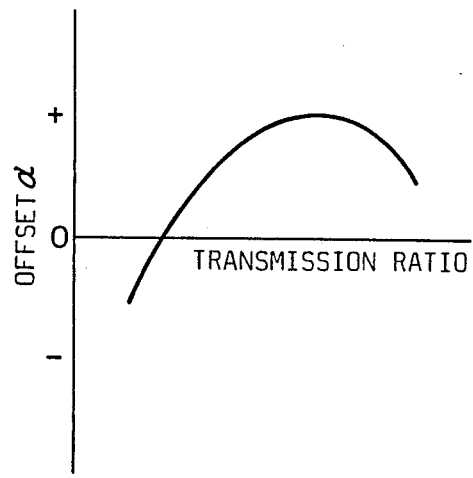
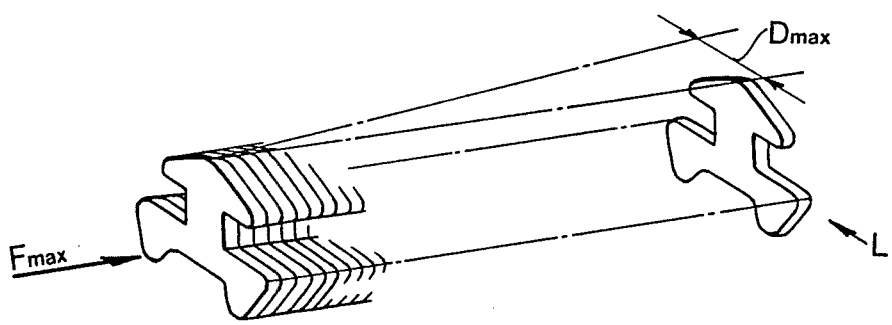
FIG. 2d

BELT FOR A CONTINUOUSLY VARIABLE TRANSMISSION

BACKGROUND OF THE INVENTION

The present invention relates to continuously variable belt-drive transmission for a motor vehicle and more particularly to a belt of the transmission in which the compliance at a tight side of the belt is improved.

A known continuously variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions.

FIGS. 2a and 2b show a belt device of the conventional continuously variable belt-drive transmission for a motor vehicle.

The belt-device 1 has an input shaft 2 and an output shaft 4 provided in parallel with the input shaft 2. A drive pulley 3 and a driven pulley 5 are mounted on shafts 2 and 4 respectively. A fixed conical disc 3a of the drive pulley 3 is integral with input shaft 2 and an axially movable conical disc 3b is axially slidably mounted on the input shaft 2. A conical face of the fixed conical disc 3a confronts a conical face of the movable conical disc 3b thereby forming a groove 24a therebetween.

A fixed conical disc 5a of the driven pulley 5 is formed on the output shaft 4 opposite a movable conical disc 5b. Conical faces of the respective discs 5a and 5b form a groove 24b. A belt 6 engages the drive pulley 3 and the driven pulley 5.

The belt 6 comprises a plurality of metal elements 10 adjacently arranged in the longitudinal direction of the belt. Each element has a body portion 12, a head portion 14, a pillar portion 13 at the center and a pair of horizontal slits at both sides thereof between the body portion 12 and head portion 14. A pair of seamless laminated endless metal carriers 30 are inserted in the slits.

Each element 10 has a projection 15 on its one side and a dimple 16 on the other side. The projection 15 of one element 10 engages with the dimple 16 of the adjacent element with a small gap therebetween and all elements are arranged side by side. The belt 6 is thus assembled.

As the movable conical discs 3b and 5b are axially moved along the shafts 2 and 4 for changing the transmission ratio, center lines a and b of the grooves 24a and 24b axially displace, respectively. However, the displacing distance of the line a is not equal to that of the line b. Accordingly, both the lines are inevitably deflected from each other, and the offset α (the distance between the lines a and b) changes with the change of the transmission ratio. FIG. 2c shows the variation of the offset α in accordance with the transmission ratio.

In such a device, a tight side 6a of the belt, which is a part of the belt leaving the groove 24a of the drive pulley 3, moves with a deviation from the line a, because of the misalignment of the lines a and b as shown in FIG. 2a. The deviation of the belt is caused by lateral deflection of each element. In addition, many of these elements 10 are arranged at the tight side 6a and they are pressed against each other in the longitudinal direction of the belt, so that the lateral deflections of the elements add up, thereby increasing the deviation of the belt. Further, the force exerted on the element causes the bending and/or tilting of the element which will enhance the deflection. Excessive lateral deflection of the element and the deviation of the belt cause an edge of carrier 30 of the belt 6 to rub against the pillar portions 13 of the elements 10 or an edge of the element entering the groove 24b of driven pulley 5 to strike the conical face of the driven pulley. Additionally, running of the belt 6 becomes unstable when entering the pulleys. As a result, the belt easily wears out and the conical surfaces become rough.

In order to eliminate these drawbacks, a transmission where the absolute value of the offset is decreased by initially offsetting the pulleys is commonly employed. In another transmission, the pulleys are disposed so as to render the offset zero at a small transmission ratio which is the most common driving condition. U.S. Pat. No. 4,596,536 discloses a continuously variable transmission where the drive pulley is so disposed that the offset is zero when the transmission ratio is one, thereby decreasing the amount of rubbing of the carrier against the elements.

However, in such a transmission, the centers of the grooves are initially offset so that amount of the overall offset increases and the loss of the transmission power at the tight side is increased because of the deviation of the belt. In addition, noise caused by a shock which occurs when each element enters the driven pulley increases.

SUMMARY OF THE INVENTION

The object of the present invention is to provide a continuously variable belt-drive transmission for a motor vehicle in which each element of the belt is formed so as to be appropriately shifted in the lateral direction in accordance with the offset thereby ensuring stable drive of the belt.

The other objects and features of this invention will become understood from the following description with reference to the accompanying drawings.

BRIEF DESCRIPTION OF THE DRAWINGS

FIG. 1b is a sectional view taken along a line A—A of FIG. 1a;

FIG. 1c is an enlarged sectional view taken along a line B—B of FIG. 1a;

FIG. 1d is an enlarged sectional view taken along a line C—C of FIG. 1a;

FIG. 1e is an enlarged sectional view taken along a line D—D of FIG. 1a;

FIG. 2b is a schematic cross section of the belt device of FIG. 2a;

FIG. 2c is a graph showing relationship between transmission ratio and amount of offset in the belt device; and FIG. 2d is a perspective view of the elements showing a deviation of the belt.

DETAILED DESCRIPTION OF THE PREFERRED EMBODIMENT

Figure 2A:
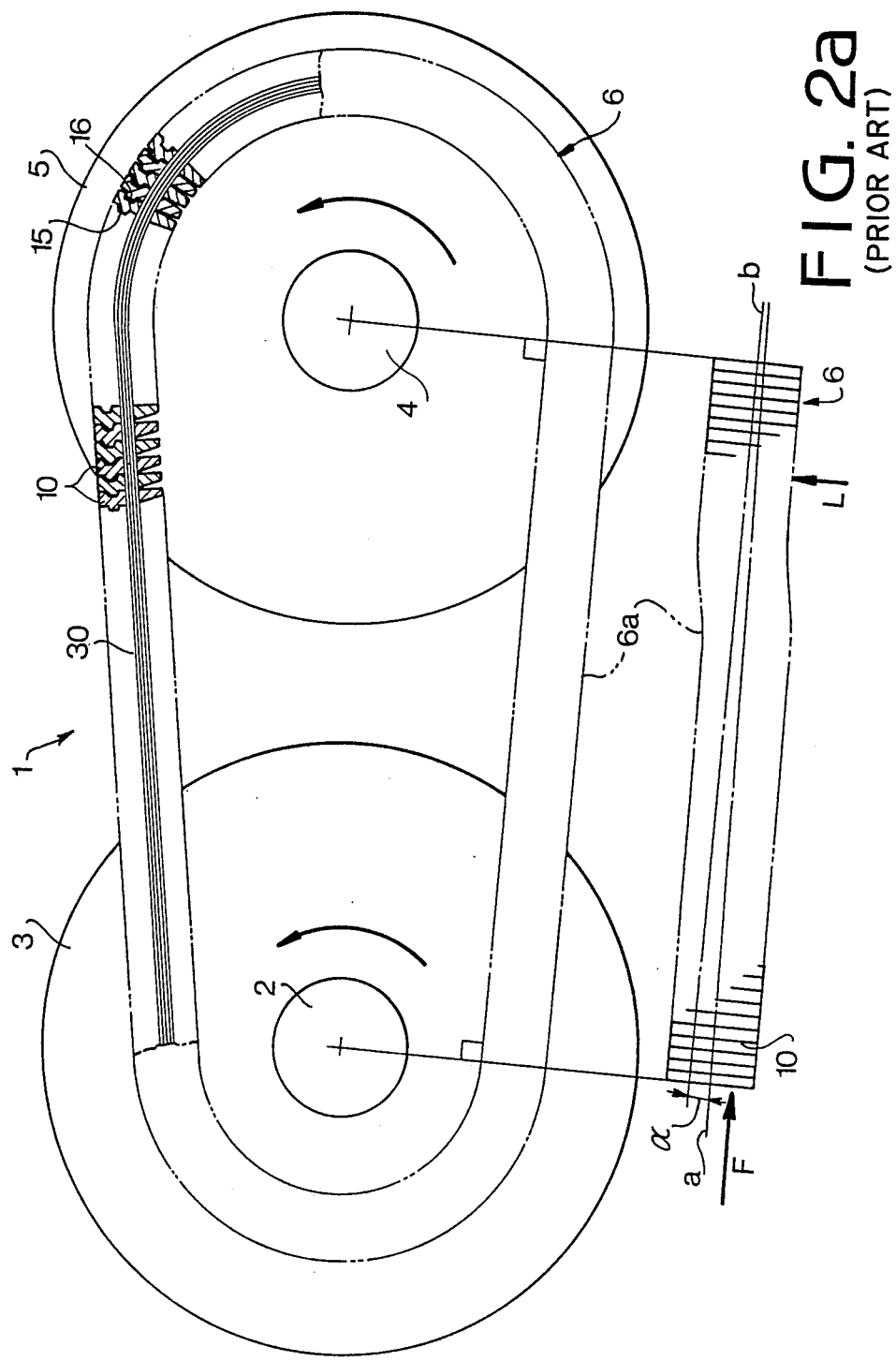
FIG. 2a is an elevational view of a conventional belt device.

A belt device to which the present invention is applied has the same construction as a conventional device shown in FIGS. 2a and 2b. The same numerals as those in FIGS. 2a and 2b designate same parts.

Figure 1A:
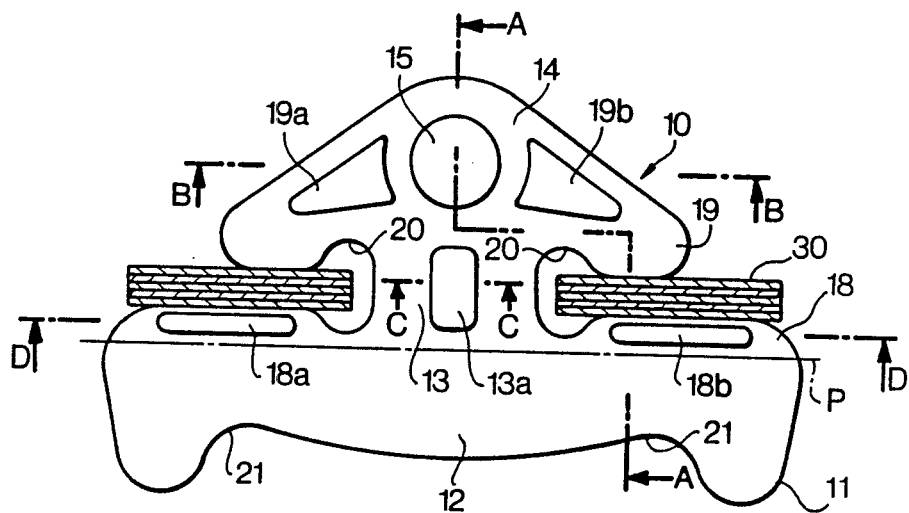
FIG. 1a is an elevational view of an element of a belt according to the present invention.
Figure 1B:
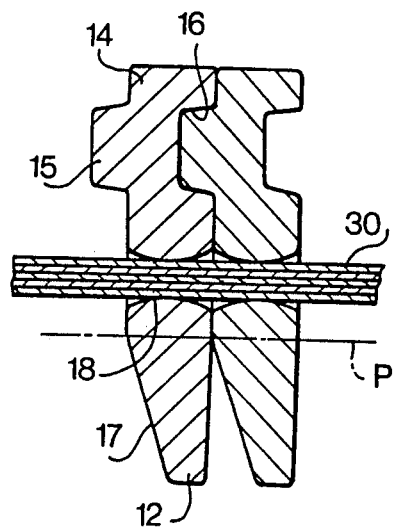
Figure 1C:
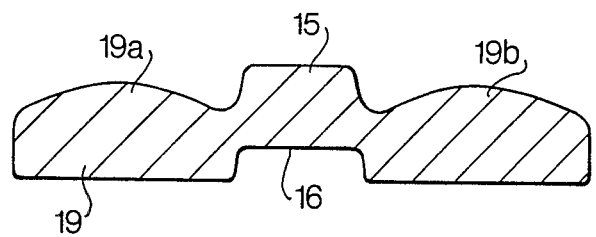
Figure 1D:
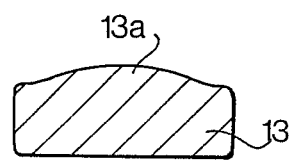
Figure 1E:
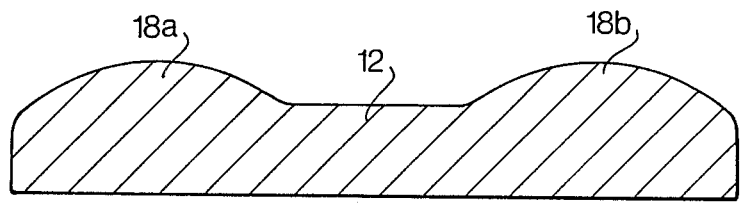

Referring to FIGS. 1a and 1b, as described earlier, the belt 6 of the belt device comprises elements 10 and seamless carrier 30. Elements 10 are arranged in the longitudinal direction of the belt with the carrier 30 inserted therein. Each element 10 has body portion 12, pillar portion 13 above the body portion 12 and head portion 14 on the top of the pillar portion 13. At a center of the head portion 14 above the pillar portion 13, projection 15 is formed on the front side of the element 10 and dimple 16 on the rear side so as to engage the adjacent elements. As shown in FIG. 1b, the thickness of the body portion 12 becomes smaller toward the bottom end, thereby forming an inclination 17 under a pitch line P. Thus, the elements 10 can pass around the pulleys. The body portion 12 has shoulders 18 at the lateral sides and the head portion 14 has ears 19 at lower side portions, each corresponding to the shoulder 18. Each shoulder 18 and ear 19 are arranged so as to firmly hold the carrier 30. A recess 20 is formed on each side of the pillar portion 13 so as to prevent the carrier 30 from rubbing the pillar portion 13. A recess 21 is formed on the bottom of the body portion 12 thereby balancing the distribution of pushing force exerted on the elements 10.

The carrier 30 comprises laminated layers of flexible thin strips so that bending stress which occurs when the carrier 30 passes over the pulley having a small effective radius, is decreased.

Referring to FIG. 2a, the upper portion of the elements 10 above the pitch line P is pressed against the corresponding portions of adjacent elements in the linear side of the running belt 6. Accordingly, high flatness of sides of the upper portion and stiffness of the element 10 are necessary for preventing excessive lateral deviation, so that the belt 6 can stably and straightforwardly run at the linear side, with appropriate deviation.

The principle of the present invention is described hereinafter. Referring to FIGS. 2a and 2d, assuming the tight side 6a is subjected to the longitudinal force F, there occurs a lateral component L in accordance with the force F and the offset $\alpha$. The element array (6a) is deviated from the longitudinal center line by the lateral component L. Now, a maximum deviation Dmax (FIG. 2d) of the element array at a maximum force Fmax during operation of the transmission is calculated (here, Dmax/L is called compliance). In the present invention, each element is so formed that the element array causes the tight side 6a to deviate actually by the deviation Dmax at the maximum force Fmax.

In accordance with the present invention, there are formed a plurality of protrusions on the front side of the element. The protrusions comprise laterally extending lower protrusions 18a, 18b below shoulders 18, a central protrusion 13a on the pillar portion 13, and protrusions 19a, 19b at both sides of the projection 15. Each protrusion has a spherical top surface.

The flatness of the front side can be easily adjusted by changing the height of each protrusion. The deviation D of the tight side 6a can be adjusted by changing the distribution heights of the protrusions. Three classes of the deviation are obtained by the distribution. Namely a maximum deviation D1, middle deviation D2 and minimum deviation D3 (D1>D2>D3). The maximum deviation D1 is obtained by making the protrusion 13a higher than the other protrusions, D2 is obtained by the protrusions 19a, 19b higher than other protrusions, and D3 is gotten when the protrusion 18a, 18b are higher than other protrusions. In addition, in the case of D3, if the curvature of the spherical top of each protrusion 18a (18b) is reduced, the deviation D3 is further reduced.

In order to coincide the actual maximum deviation of the tight side 6a to the theoretical maximum deviation Dmax, the deviation D3 is preferable.

Thus, in operation, the belt of the straight running side deviates in accordance with the offset of the drive and driven pulleys dependent on its own characteristic. Accordingly, the belt smoothly enters into the groove of the pulley without striking the pulley, thereby ensuring the stable drive of the belt.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a belt system for a continuously variable transmission for a motor vehicle, having a drive pulley, a driven pulley, and a belt comprising elements arranged in a longitudinal direction of the belt with a carrier inserted therein for engaging both of said pulleys respectively and defining an offset between the drive pulley and driven pulley, each element having a projection formed on one side thereof and a dimple formed on the other side thereof, said projection of said elements engaging in said dimple of an adjacent of the elements, and a flat face formed on each of the elements, the improvement in the belt system wherein the elements further comprise protrusion means formed on one of the sides of each said element for contacting the flat face of the other side of the adjacent said element and for adjusting attitude of the elements mounted on the carrier depending on a lateral component of longitudinal force caused by running of the belt between both of the pulleys so as to smoothly enable the belt to enter both of said pulleys without striking both said pulleys.

2. The belt system according to claim 1, wherein said protrusion means is arranged such that actual lateral deviation of the belt coincides with a theoretical deviation of the belt.

3. The belt system according to claim 1, wherein said protrusion means comprises a plurality of protrusions each having a substantially spherical top surface.

4. The belt system according to claim 1, wherein said protrusion means comprises at least one pair of laterally extending protrusions.

5. The belt system according to claim 4, wherein said protrusion means comprises an upper pair and a lower pair of laterally extending protrusions, and said projection being located between said upper pair of laterally extending protrusions.

6. The belt system according to claim 5, wherein the upper pair is disposed higher than said carrier and the laterally extending protrusions of said upper pair extend in a direction laterally away from said projection and downwardly tapering, in plan view, the lower pair is disposed lower than said carrier and the laterally extending protrusions of said lower pair extend substantially horizontally, in plan view.

7. The belt system according to claim 4, wherein said protrusion means further comprises a central protrusion located under said projection in a pillar portion of each said element.

8. The belt system according to claim 5, wherein said protrusion means further comprises a central protrusion located under said projection in a pillar portion of each said element.

9. The belt system according to claim 8, wherein the height of said protrusion of said lower pair is greater than that of all the other of said protrusion means.

* * * * *